(12) United States Patent
Kairouz et al.

(10) Patent No.: US 9,730,094 B2
(45) Date of Patent: Aug. 8, 2017

(54) BURSTY-INTERFERENCE-AWARE INTERFERENCE MANAGEMENT

(71) Applicant: QUALCOMM Incorporated, San Diego, CA (US)

(72) Inventors: Peter Kairouz, Champaign, IL (US); Ahmed Kamel Sadek, San Diego, CA (US); Kambiz Azarian Yazdi, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/446,114

(22) Filed: Jul. 29, 2014

(65) Prior Publication Data

US 2016/0037364 A1 Feb. 4, 2016

(51) Int. Cl.
*H04W 4/00* (2009.01)
*H04W 24/08* (2009.01)
*H04L 1/00* (2006.01)

(52) U.S. Cl.
CPC ........... *H04W 24/08* (2013.01); *H04L 1/0007* (2013.01); *H04L 1/0015* (2013.01)

(58) Field of Classification Search
CPC ..... H04W 24/08; H04L 1/0007; H04L 1/0015
See application file for complete search history.

(56) References Cited

U.S. PATENT DOCUMENTS 5,343,465 A  8/1994 Khalil
6,421,632 B1  7/2002 LeCorney
6,674,719 B1  1/2004 LeCorney
(Continued)

FOREIGN PATENT DOCUMENTS

EP  1225736 A2  7/2002
EP  1919114 A1 *  5/2008  ........... H04L 1/0007

OTHER PUBLICATIONS

International Search Report and Written Opinion—PCT/US2015/042493—ISA/EPO—Sep. 24, 2015.
(Continued)

*Primary Examiner* — Phuc Tran
(74) *Attorney, Agent, or Firm* — Muncy, Geissler, Olds & Lowe, P.C./Qualcomm

(57) ABSTRACT

A method of interference management for a wireless device in a wireless communication system may comprise monitoring a packet error metric associated with transmissions over a communication channel of the wireless communication system, modifying a packet size attribute associated with MPDUs processed at the wireless device, identifying a bursty interference condition on the communication channel based on a change in the packet error metric in response to the modified packet size attribute, and generating a bursty interference indicator based on the identification of the bursty interference condition. Another method may comprise receiving a bursty interference indicator identifying a bursty interference condition on a communication channel of the wireless communication system, adjusting a packet size attribute associated with MPDUs processed at the wireless device based on the bursty interference indicator, and transmitting one or more MPDUs over the communication channel according to the adjusted packet size attribute.

40 Claims, 13 Drawing Sheets

(56) References Cited

U.S. PATENT DOCUMENTS

| | | | |
|---|---|---|---|
| 7,047,164 B1 | 5/2006 | Swift | |
| 7,385,945 B1 | 6/2008 | Olson et al. | |
| 7,519,030 B2 | 4/2009 | Cimini et al. | |
| 8,265,564 B2* | 9/2012 | Lee | H04L 1/0007 370/242 |
| 8,345,565 B2 | 1/2013 | Hirsch | |
| 8,473,821 B2 | 6/2013 | Taghavi et al. | |
| 2001/0029189 A1 | 10/2001 | Mandyam | |
| 2002/0151318 A1 | 10/2002 | Kline et al. | |
| 2004/0105406 A1 | 6/2004 | Kayama et al. | |
| 2004/0146023 A1 | 7/2004 | Pietraski et al. | |
| 2005/0185722 A1 | 8/2005 | Abe et al. | |
| 2005/0195858 A1 | 9/2005 | Nishibayashi et al. | |
| 2006/0048034 A1 | 3/2006 | Cho | |
| 2006/0093024 A1 | 5/2006 | Pietraski et al. | |
| 2006/0133543 A1 | 6/2006 | Linsky et al. | |
| 2006/0193299 A1 | 8/2006 | Winget et al. | |
| 2007/0086335 A1 | 4/2007 | McCanne et al. | |
| 2007/0105501 A1* | 5/2007 | Shen | H04L 1/0002 455/63.1 |
| 2008/0025266 A1 | 1/2008 | Tynderfeldt et al. | |
| 2008/0101411 A1* | 5/2008 | Takahashi | H04L 1/1896 370/473 |
| 2008/0119215 A1 | 5/2008 | Ji et al. | |
| 2008/0148129 A1 | 6/2008 | Moon et al. | |
| 2009/0122717 A1 | 5/2009 | Das et al. | |
| 2009/0149135 A1 | 6/2009 | Mangold et al. | |
| 2009/0186621 A1 | 7/2009 | Umeda et al. | |
| 2009/0207768 A1 | 8/2009 | Wang et al. | |
| 2010/0120459 A1 | 5/2010 | Delaval | |
| 2010/0208685 A1 | 8/2010 | Kim et al. | |
| 2010/0316013 A1 | 12/2010 | Jin et al. | |
| 2011/0170424 A1 | 7/2011 | Safavi | |
| 2011/0176484 A1 | 7/2011 | Vitthaladevuni et al. | |
| 2011/0286340 A1 | 11/2011 | Janecek et al. | |
| 2012/0082070 A1 | 4/2012 | Hart et al. | |
| 2012/0282889 A1 | 11/2012 | Tanaka et al. | |
| 2013/0176877 A1 | 7/2013 | Sadek et al. | |
| 2013/0322277 A1 | 12/2013 | Vanganuru et al. | |
| 2014/0198872 A1 | 7/2014 | Barriac et al. | |
| 2015/0318936 A1 | 11/2015 | Valliappan et al. | |
| 2015/0319767 A1 | 11/2015 | Azarian et al. | |
| 2016/0037363 A1 | 2/2016 | Kairouz et al. | |

OTHER PUBLICATIONS

Akhtar Z., et al., "BLMon: A Loss Differentiation Scheme for 802.11n," IEEE Conference on Computer Communications Workshops (INFOCOM WKSHPS), Apr. 14, 2013, XP032700507, pp. 83-84.

Anwar R., et al., "Loss Differentiation: Moving onto High-Speed wireless LANs," Proceedings IEEE INFOCOM, Apr. 27, 2014, XP032613542, pp. 2463-2471.

Cho M., et al., "Distinguishing collisions from low signal strength in static 802.11n wireless LANs," Proceedings of the ACM CoNEXT Student Workshop, 2011, 2 pages.

Gong F., et al., "An Application-Oriented Error Control Scheme for High-Speed Networks," IEEE/ACM Transactions on Networking, Oct. 1, 1996, vol. 4 (5), XP011039017, pp. 669-683.

Huang J., et al., "Beyond Co-Existence: Exploiting Wifi White Space for Zigbee Performance Assurance", 18th IEEE International Conference on Network Protocols (ICNP), IEEE, Oct. 5, 2010 (Oct. 5, 2010), pp. 305-314, XP031864739, DOI: 10.1109/ICNP.2010. 5762779 ISBN: 978-1-4244-8644-1 the whole document.

Judd G., et al., "Efficient Channel-Aware Rate Adaptation in Dynamic Environments," Proceedings of the 6th International conference on Mobile systems, applications, and services, 2008, pp. 118-131.

Zarikoff B., et al., "A Non-Parametric Approach to Estimating Ambient Noise Levels in the Presence of Bursty Interference," Wireless Communications Letters, 2012, vol. 1(2), pp. 69-72.

\* cited by examiner

BURSTY-INTERFERENCE-AWARE INTERFERENCE MANAGEMENT

INTRODUCTION

Aspects of this disclosure relate generally to telecommunications, and more particularly to interference management and the like.

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). One class of such multiple-access systems is generally referred to as "Wi-Fi," and includes different members of the Institute of Electrical and Electronics Engineers (IEEE) 802.11 wireless protocol family. Generally, a Wi-Fi communication system can simultaneously support communication for multiple wireless stations (STAs). Each STA communicates with one or more access points (APs) via transmissions on the downlink and the uplink. The downlink (DL) refers to the communication link from the APs to the STAs, and the uplink (UL) refers to the communication link from the STAs to the APs.

Various protocols and procedures in Wi-Fi, such as carrier sense multiple access (CSMA), allow different STAs operating on the same channel to share the same wireless medium. However, because of hidden terminals, for example, Wi-Fi STAs operating in neighboring basic service sets (BSSs) on the same channel may still interfere with one another. This interference degrades the performance of the wireless link because of increased packet losses. Packet losses in dense Wi-Fi deployments may be broadly classified into three types: packet losses due to channel fading; packet collisions due to long, data packet transmissions (usually DL transmissions from other co-channel APs and/or STAs); and packet collisions due to short, bursty (time-selective) packet transmissions (usually acknowledgement, management, and upper layer packets from other co-channel APs and/or STAs). Conventional rate control algorithms are not designed to handle bursty interference.

There accordingly remains a need for classifying the type of packet errors/interference observed according to the nature of the interferer and channel conditions, and for taking remedial actions appropriate to the type of packet errors/interference determined to be present.

SUMMARY

Systems and methods for interference management for a wireless device in a wireless communication system are disclosed.

A method of interference management for a wireless device in a wireless communication system is disclosed. The method may comprise, for example: monitoring a packet error metric associated with transmissions over a communication channel of the wireless communication system; modifying a packet size attribute associated with media access control (MAC) protocol data units (MPDUs) processed at the wireless device; identifying a bursty interference condition on the communication channel based on a change in the packet error metric in response to the modified packet size attribute; and generating a bursty interference indicator based on the identification of the bursty interference condition.

An apparatus for interference management for a wireless device in a wireless communication system is also disclosed. The apparatus may comprise, for example, a processor and memory coupled to the processor for storing data. The processor may be configured to, for example: monitor a packet error metric associated with transmissions over a communication channel of the wireless communication system; modify a packet size attribute associated with MPDUs processed at the wireless device; identify a bursty interference condition on the communication channel based on a change in the packet error metric in response to the modified packet size attribute; and generate a bursty interference indicator based on the identification of the bursty interference condition.

Another apparatus for interference management for a wireless device in a wireless communication system is also disclosed. The apparatus may comprise, for example: means for monitoring a packet error metric associated with transmissions over a communication channel of the wireless communication system; means for modifying a packet size attribute associated with MPDUs processed at the wireless device; means for identifying a bursty interference condition on the communication channel based on a change in the packet error metric in response to the modified packet size attribute; and means for generating a bursty interference indicator based on the identification of the bursty interference condition.

A computer-readable medium comprising code, which, when executed by a processor, causes the processor to perform operations for interference management for a wireless device in a wireless communication system is also disclosed. The computer-readable medium may comprise, for example: code for monitoring a packet error metric associated with transmissions over a communication channel of the wireless communication system; code for modifying a packet size attribute associated with MPDUs processed at the wireless device; code for identifying a bursty interference condition on the communication channel based on a change in the packet error metric in response to the modified packet size attribute; and code for generating a bursty interference indicator based on the identification of the bursty interference condition.

Another method of interference management for a wireless device in a wireless communication system is also disclosed. The method may comprise, for example: receiving a bursty interference indicator identifying a bursty interference condition on a communication channel of the wireless communication system; adjusting a packet size attribute associated with MPDUs processed at the wireless device based on the bursty interference indicator; and transmitting one or more MPDUs over the communication channel according to the adjusted packet size attribute.

Another apparatus for interference management for a wireless device in a wireless communication system is also disclosed. The apparatus may comprise, for example, a processor and memory coupled to the processor for storing data. The processor may be configured to, for example: receive a bursty interference indicator identifying a bursty interference condition on a communication channel of the wireless communication system; adjust a packet size attribute associated with MPDUs processed at the wireless device based on the bursty interference indicator; and transmit one or more MPDUs over the communication channel according to the adjusted packet size attribute.

Another apparatus for interference management for a wireless device in a wireless communication system is also disclosed. The apparatus may comprise, for example: means for receiving a bursty interference indicator identifying a bursty interference condition on a communication channel of the wireless communication system; means for adjusting a packet size attribute associated with MPDUs processed at the wireless device based on the bursty interference indicator; and means for transmitting one or more MPDUs over the communication channel according to the adjusted packet size attribute.

Another computer-readable medium comprising code, which, when executed by a processor, causes the processor to perform operations for interference management for a wireless device in a wireless communication system is also disclosed. The computer-readable medium may comprise, for example: code for receiving a bursty interference indicator identifying a bursty interference condition on a communication channel of the wireless communication system; code for adjusting a packet size attribute associated with MPDUs processed at the wireless device based on the bursty interference indicator; and code for transmitting one or more MPDUs over the communication channel according to the adjusted packet size attribute.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The disclosure relates in some aspects to interference management for a wireless device in a wireless communication system. By monitoring the effect of packet size, for example, on packet errors over a given communication channel, a bursty interference condition may be identified on the communication channel. For example, the bursty interference condition may be identified based on a decrease in packet errors in response to a decrease in packet size. A drop in the error rate in response to a reduction in packet size has been found to be characteristic of the presence of bursty interference, where the short temporal nature of the bursty interference may be isolated to one or a small number of packets regardless of size. Accordingly, bursty interference may be detected as well as mitigated based on packet size adjustments in accordance with the aspects disclosed herein to facilitate bursty-interference-aware interference management. By providing bursty-interference-aware interference management, the present disclosure enables more sophisticated rate control to increase user throughputs and enhance overall network capacity.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
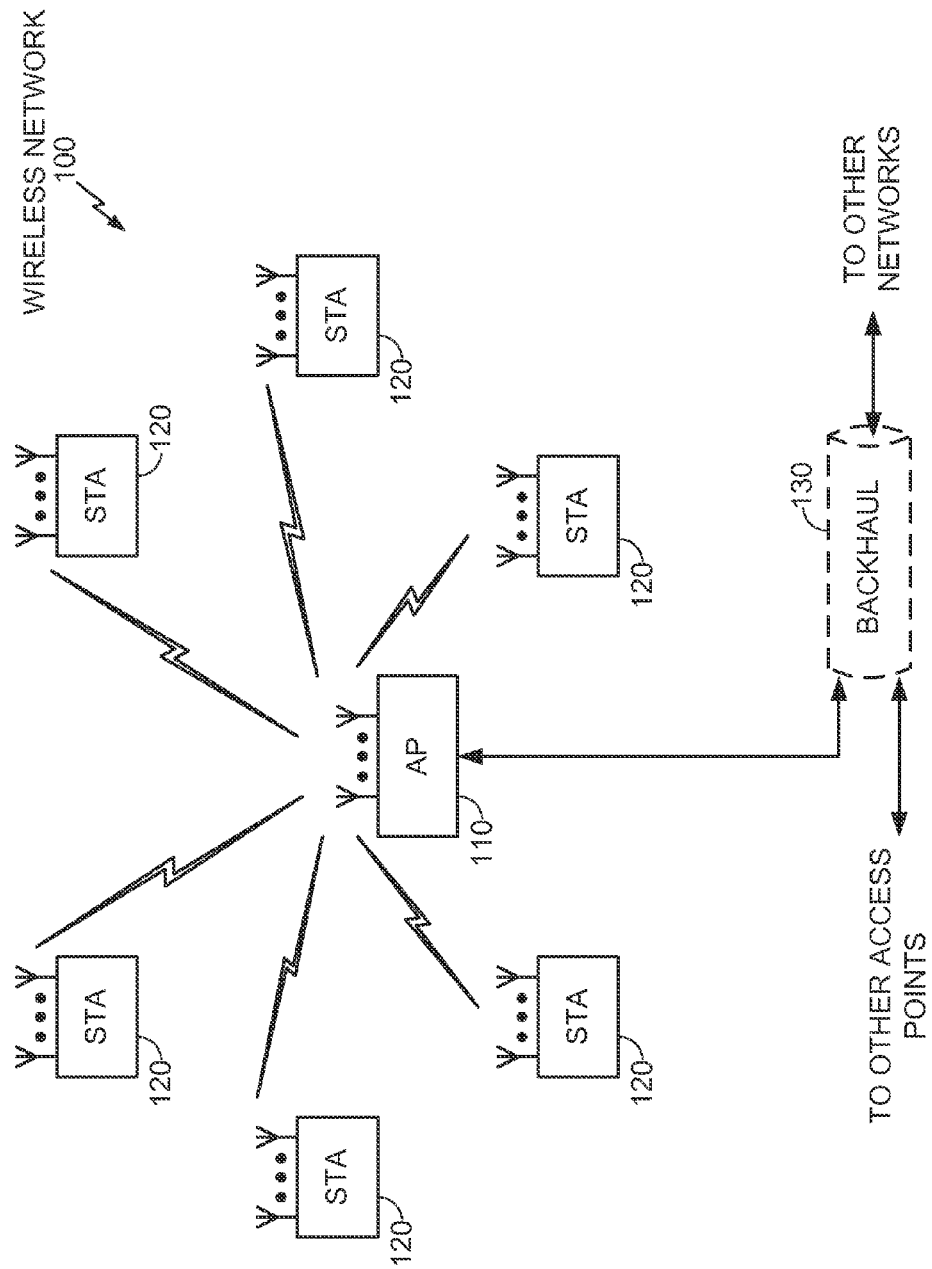
FIG. 1 illustrates an example wireless network.

FIG. 1 illustrates an example wireless network 100. As shown, the wireless network 100, which may also be referred to herein as a basic service set (BSS), is formed from several wireless nodes, including an access point (AP) 110 and a plurality of subscriber stations (STAs) 120. Each wireless node is generally capable of receiving and/or transmitting. The wireless network 100 may support any number of APs 110 distributed throughout a geographic region to provide coverage for the STAs 120. For simplicity, one AP 110 is shown in FIG. 1, providing coordination and control among the STAs 120, as well as access to other APs or other networks (e.g., the Internet) via a backhaul connection 130.

The AP 110 is generally a fixed entity that provides backhaul services to the STAs 120 in its geographic region of coverage. However, the AP 110 may be mobile in some applications (e.g., a mobile device serving as a wireless hotspot for other devices). The STAs 120 may be fixed or mobile. Examples of STAs 120 include a telephone (e.g., cellular telephone), a laptop computer, a desktop computer, a personal digital assistant (PDA), a digital audio player (e.g., MP3 player), a camera, a game console, a display device, or any other suitable wireless node. The wireless network 100 may be referred to as a wireless local area network (WLAN), and may employ a variety of widely used networking protocols to interconnect nearby devices. In general, these networking protocols may be referred to as "Wi-Fi," including any member of the Institute of Electrical and Electronics Engineers (IEEE) 802.11 wireless protocol family.

For various reasons, interference may exist in the wireless network 100, leading to different degrees of packet loss and degradations of performance. The interference may be derived from different sources, however, and different classes of interference may affect the wireless network 100 in different ways. Several example classes of interference are described below.

Figure 2:
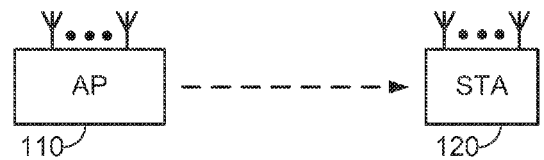
FIG. 2 illustrates example classes of interference that may be experienced by nodes in a wireless network.
Figure 2:
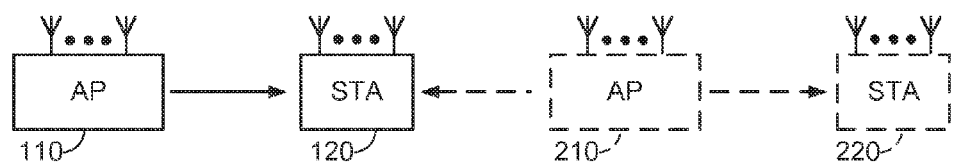
Figure 2:
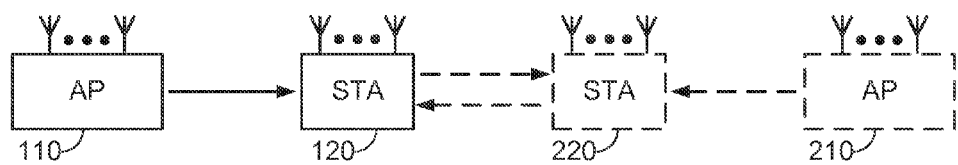

FIG. 2 illustrates several example classes of interference that may be experienced by nodes in a wireless network. In each of the examples, the AP 110 and one of the STAs 120 of the wireless network 100 from FIG. 1 are engaged in a downlink communication session where the AP 110 sends one or more packets to the STA 120.

In the first illustrated interference scenario, the communication link between the AP 110 and the STA 120 experiences time-varying signal conditions due to environmental variations, such as multipath propagation effects or shadowing. This interference scenario is typically referred to as channel fading.

In the second illustrated interference scenario, the STA 120 is operating in the vicinity of another BSS including a neighboring AP 210 and a neighboring STA 220. Because the STA 120 is within range of the neighboring AP 210, co-channel transmissions from the neighboring AP 210 to the neighboring STA 220 will be received at the STA 120 as well, thereby distorting channel conditions and interfering with the communication link between the AP 110 and the STA 120. This interference scenario is typically referred to as (long) packet collisions.

In the third illustrated interference scenario, the STA 120 is again operating in the vicinity of another BSS including the neighboring AP 210 and the neighboring STA 220. Here, the STA 120 is out of range of the neighboring AP 210 but within range of the neighboring STA 220. Because the STA 120 is within range of the neighboring STA 220, any transmissions from the neighboring STA 220 to the neighboring AP 210 may potentially interfere with the communication link between the AP 110 and the STA 120. (The same is true of transmissions from the STA 120 to the AP 110, which may potentially interfere with the communication link between the neighboring AP 210 and the neighboring STA 220, as shown.) Examples of potentially interfering communications include not only uplink data traffic, but also acknowledgement (ACK) messages, management messages, and various other upper layer signaling. This interference scenario is typically referred to as (short) bursty interference, and derives from the "hidden node" or "hidden terminal" problem.

Figure 3:
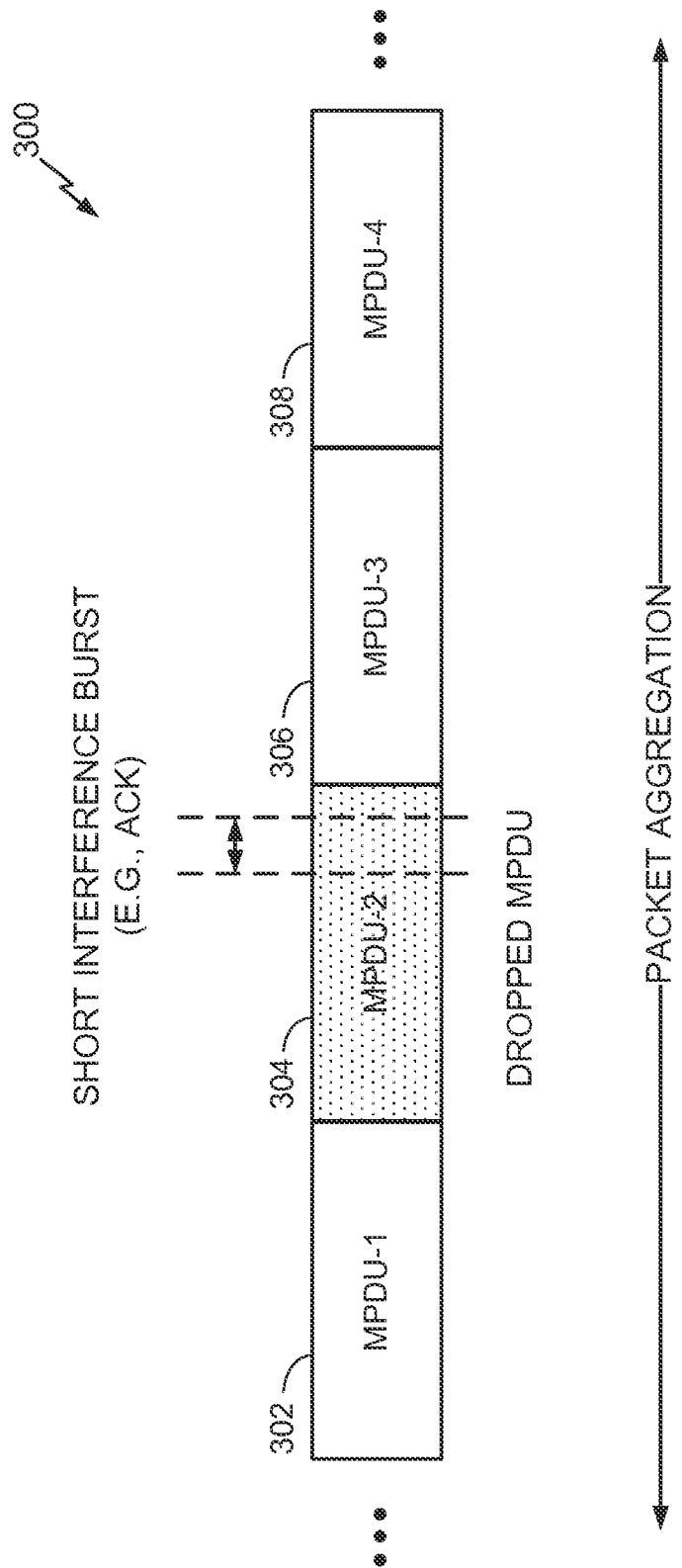
FIG. 3 illustrates the effect of bursty interference during an example transmission opportunity.

FIG. 3 illustrates the effect of bursty interference during an example transmission opportunity (TxOP). In this example, the transmission 300 includes an aggregation of media access control (MAC) protocol data units (MPDUs), including a first MPDU (MPDU-1) 302, a second MPDU (MPDU-2) 304, a third MPDU (MPDU-3) 306, and a fourth MPDU (MPDU-4) 308. An MPDU is a message subframe exchanged between MAC entities, such as the AP 110 and one of the STAs 120 of the wireless network 100 shown in FIG. 1. When the MPDU is larger than the MAC service data unit (MSDU) received from a higher layer in the protocol stack, the MPDU may include multiple MSDUs as a result of packet aggregation. When the MPDU is smaller than the MSDU, each MSDU may generate multiple MPDUs as a result of packet segmentation.

As shown, the second MPDU (MPDU-2) 304 is subjected to a short burst of interference, such as an ACK message from a neighboring node as discussed above in relation to FIG. 2. The interference bursts causes the decoding of the second MPDU (MPDU-2) 304 to fail, and for the second MPDU (MPDU-2) 304 to be dropped.

As discussed in the background above, conventional rate control algorithms are designed to handle channel fading and packet collision interference scenarios, not bursty interference scenarios such as the one illustrated in FIG. 3. In fact, conventional rate control algorithms applied to bursty interference may actually exacerbate the effect of the interference. For example, reducing the transmission rate in response to the dropped MPDU (e.g., via a lower modulation and coding scheme), as appropriate for a packet collision interference scenario, decreases the number of MPDUs transmitted during a given TxOP and therefore increases the relative impact of a short interference burst. By providing bursty-interference-aware interference management, the present disclosure enables more sophisticated rate control to increase user throughputs and enhance overall network capacity.

Figure 4:
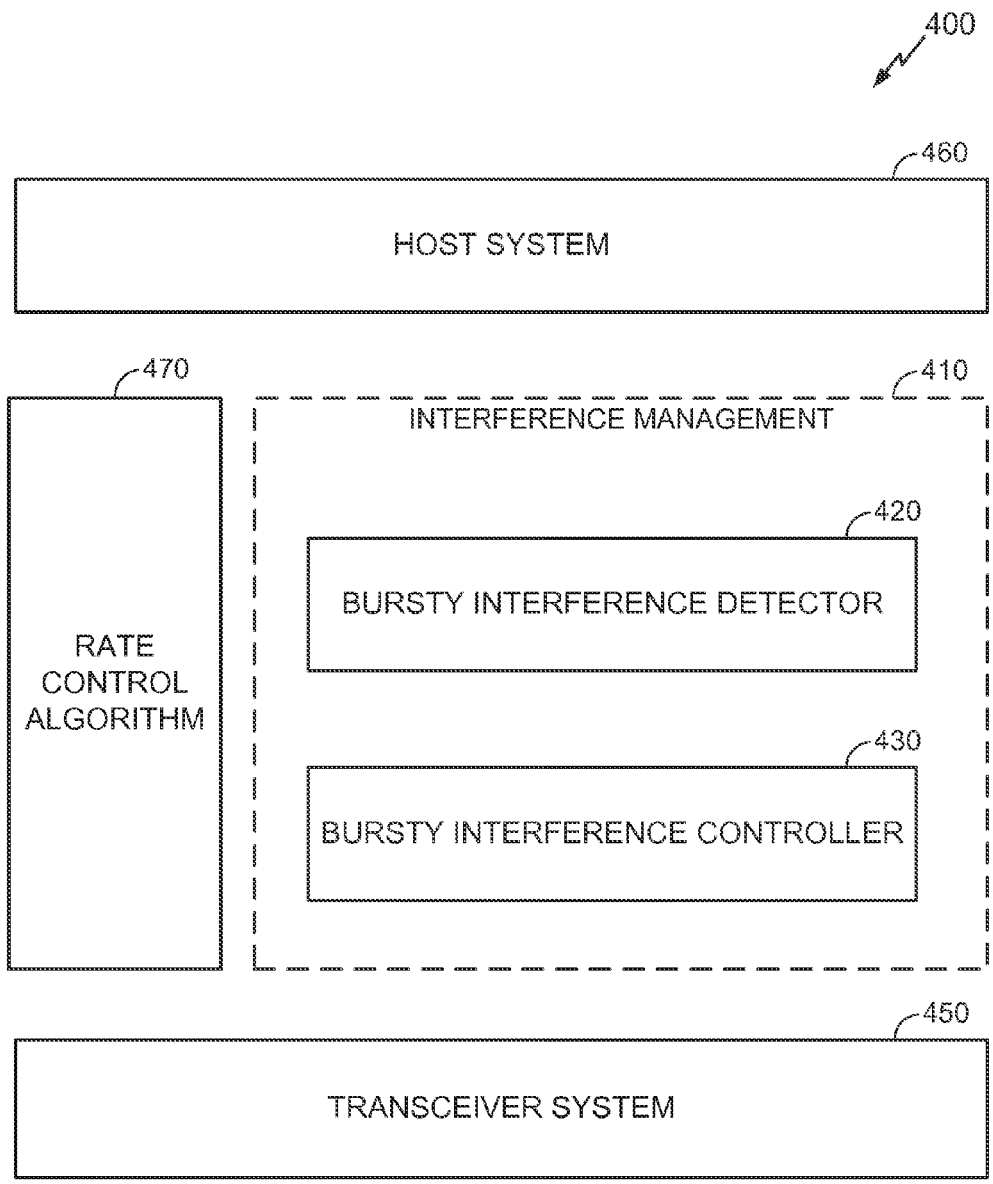
FIG. 4 is a block diagram illustrating an example bursty-interference-aware interference management module for a wireless device in a wireless communication system.

FIG. 4 is a block diagram illustrating an example bursty-interference-aware interference management module for a wireless device in a wireless communication system. The wireless device 400 in which the interference management module 410 is deployed may be a Wi-Fi access point, for example, such as the AP 110 in FIG. 1, but more generally any entity performing rate control.

As shown, the interference management module 410 may be deployed in conjunction with native transceiver system functionality 450 and host system functionality 460 of the wireless device 400. The transceiver system 450 provides the requisite wireless communication functionality in accordance with a given communication protocol (e.g., Wi-Fi), and may include one or more antennas, modulators, demodulators, buffers, TX/RX processors, and so on. Among other tasks, the transceiver system 450 in this example configuration performs packet (e.g., MPDU) processing and associated functions. The host system 460 provides the application-oriented services for the wireless device 400, and may include a processor, associated memory, software for a variety of applications, special purpose modules, and so on.

The interference management module 410 may also be deployed in conjunction with a rate control algorithm 470 operating at the wireless device 400. Rate control algorithms are employed by wireless devices to control the transmission data rate by optimizing system performance. They may operate, for example, based on throughput calculations and drop probabilities associated with different rates (e.g., a table that is dynamically populated or derived from predetermined simulations). If the current throughput is less than the drop probability, for example, the rate control algorithm may increase the transmission data rate.

Turning to the interference management module 410 in more detail, the interference management module 410 may include a bursty interference detector 420 and a bursty interference controller 430. The bursty interference detector 420 is configured to identify a bursty interference condition on a communication channel, as distinguished from channel fading interference and packet collisions. In response to the identification, the bursty interference controller 430 is configured to take remedial action to address the bursty interference condition. The bursty interference detector 420 and the bursty interference controller 430 may be implemented in different ways according to different designs and applications. Several examples are provided below.

It will be appreciated that although the disclosed examples may be discussed individually for illustration purposes, different aspects of the different implementations for the bursty interference detector 420 and/or the bursty interference controller 430 may be combined in different ways, not only with other disclosed aspects but also with other aspects beyond the scope of this disclosure, as appropriate. Conversely, it will be appreciated that different aspects of the different implementations for the bursty interference detector 420 and/or the bursty interference controller 430 may be used independently, even if described in concert for illustration purposes.

Figure 5:
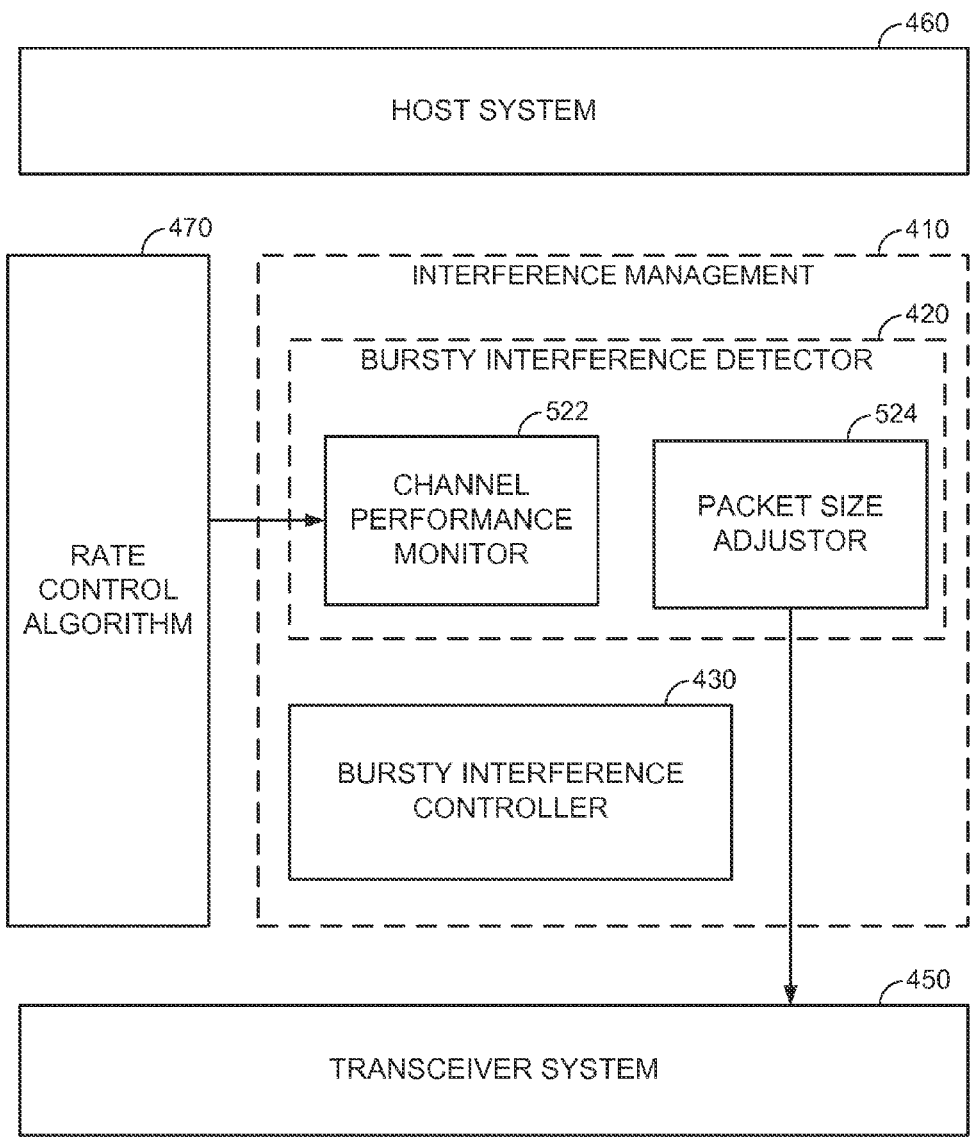
FIG. 5 is a block diagram illustrating an example design for one or more bursty interference detection aspects of a bursty-interference-aware interference management module.

FIG. 5 is a block diagram illustrating an example design for one or more bursty interference detection aspects of a bursty-interference-aware interference management module. In this example, the bursty interference detector 420 includes a channel performance monitor 522 and a packet size adjustor 524.

The channel performance monitor 522 is configured to monitor a packet error metric associated with transmissions over a communication channel. The packet error metric may correspond to a packet error rate (PER), a packet loss rate (PLR), or some other metric related to packet transmission success rates. The monitoring may be performed continuously, periodically, or on an event-driven basis, as desired. In some designs, the monitoring may be performed directly by the channel performance monitor 522 via different performance measurements on channel traffic. In other designs, however, the channel performance monitor 522 may probe the rate control algorithm 470 for packet error information. As part of its throughput calculations, the rate control algorithm 470 processes various packet transmission statistics, including PER or a similar metric. Accordingly, to obtain the current PER, for example, the channel performance monitor 522 may request it from the rate control algorithm 470.

The packet size adjustor 524 is configured to modify the size of individual MPDUs processed at wireless device (e.g., by the transceiver system 450). This may be achieved via a packet size attribute associated with MPDUs at the wireless device 400 (e.g., number of bits, bytes, or some other length value defined for each MPDU). The modifying may be performed continuously, periodically, or on an event-driven basis, as desired. By modifying the size of individual MPDUs, the packet size adjustor 524 causes the rate control algorithm 470 to collect PER statistics (or a related metric) associated with different MPDU sizes, which may then be obtained by the channel performance monitor 522.

Based on the observed effect of packet size on channel performance, the bursty interference detector 420 may identify a bursty interference condition on the communication channel, and distinguish it from channel fading interference and packet collision interference. For example, the bursty interference detector 420 may look for a drop in PER in response to a reduction in packet size, which has been found to be characteristic of the presence of bursty interference, where the relative impact of a short interference burst is isolated to fewer packets and made proportionally smaller by an increase in the total number of packets in a given TxOP. Accordingly, the bursty interference detector 420 may identify a bursty interference condition when the packet size adjustor 524 reduces the packet size attribute (e.g., an MPDU reduction from 1500 bytes to 750 bytes) and the channel performance monitor 522 detects a decrease in PER (e.g., by a threshold amount). Conversely, the bursty interference detector 420 may identify a bursty interference condition when the packet size adjustor 524 increases the packet size attribute (e.g., an MPDU increase from 750 bytes to 1500 bytes) and the channel performance monitor 522 detects an increase in PER (e.g., by a threshold amount).

In response to the identification of a bursty interference condition on the communication channel by the bursty interference detector 420, the bursty interference controller 430 may generate a bursty interference indicator, which may take different forms in different designs and applications, ranging for example from a flag identifying the presence of bursty interference to more sophisticated control signaling.

Figure 6:
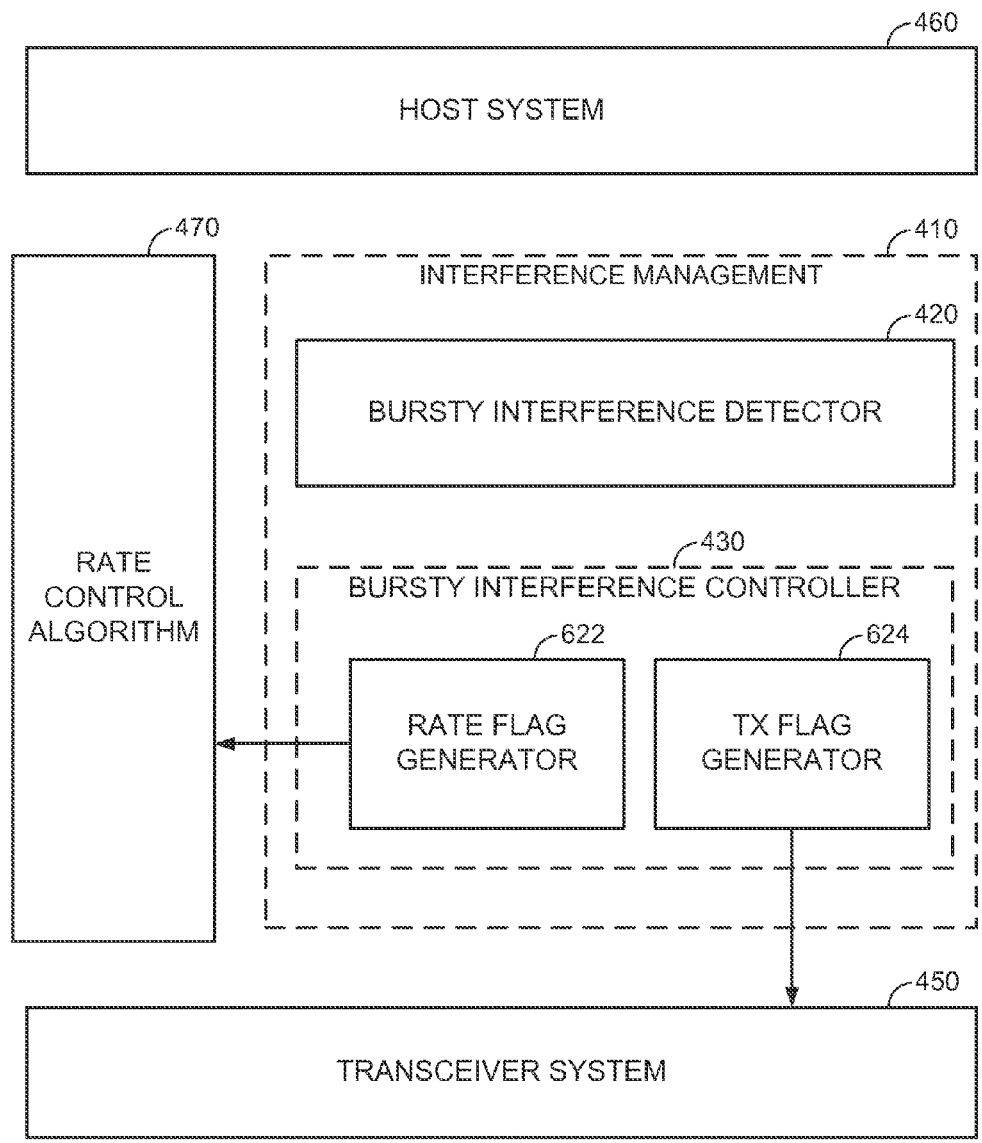
FIG. 6 is a block diagram illustrating an example design for one or more bursty interference control aspects of a bursty-interference-aware interference management module.

FIG. 6 is a block diagram illustrating an example design for one or more bursty interference control aspects of a bursty-interference-aware interference management module. In this example, the bursty interference controller 430 includes one or more bursty interference flag generators, two of which are shown for illustration purposes, including a rate flag generator 622 and a transmit (TX) flag generator 624.

The rate flag generator 622 is configured to output a bursty interference indicator to the rate control algorithm 470. This type of indicator allows the rate control algorithm 470 to react to channel fading interference and packet collision interference without confusing them with bursty interference. For example, the rate control algorithm 470 may maintain the currently selected rate (e.g., for a predetermined duration) or in some cases increase the currently selected rate in response to a sudden increase in PER when the increase is identified as corresponding to bursty interference. Maintaining the currently selected rate even when PER increases suddenly prevents the short interference burst from affecting a larger proportion of packets as would be the case at lower rates, and keeps throughput from dropping further.

The TX flag generator 624 is configured to output a bursty interference indicator to the transceiver system 450. This type of indicator allows the transceiver system 450 to schedule transmissions around any perceived bursty interference. For example, the transceiver system 450 may identify a corresponding duty cycle of a jammer entity associated with the bursty interference, and schedule data transmissions at other times.

Figure 7:
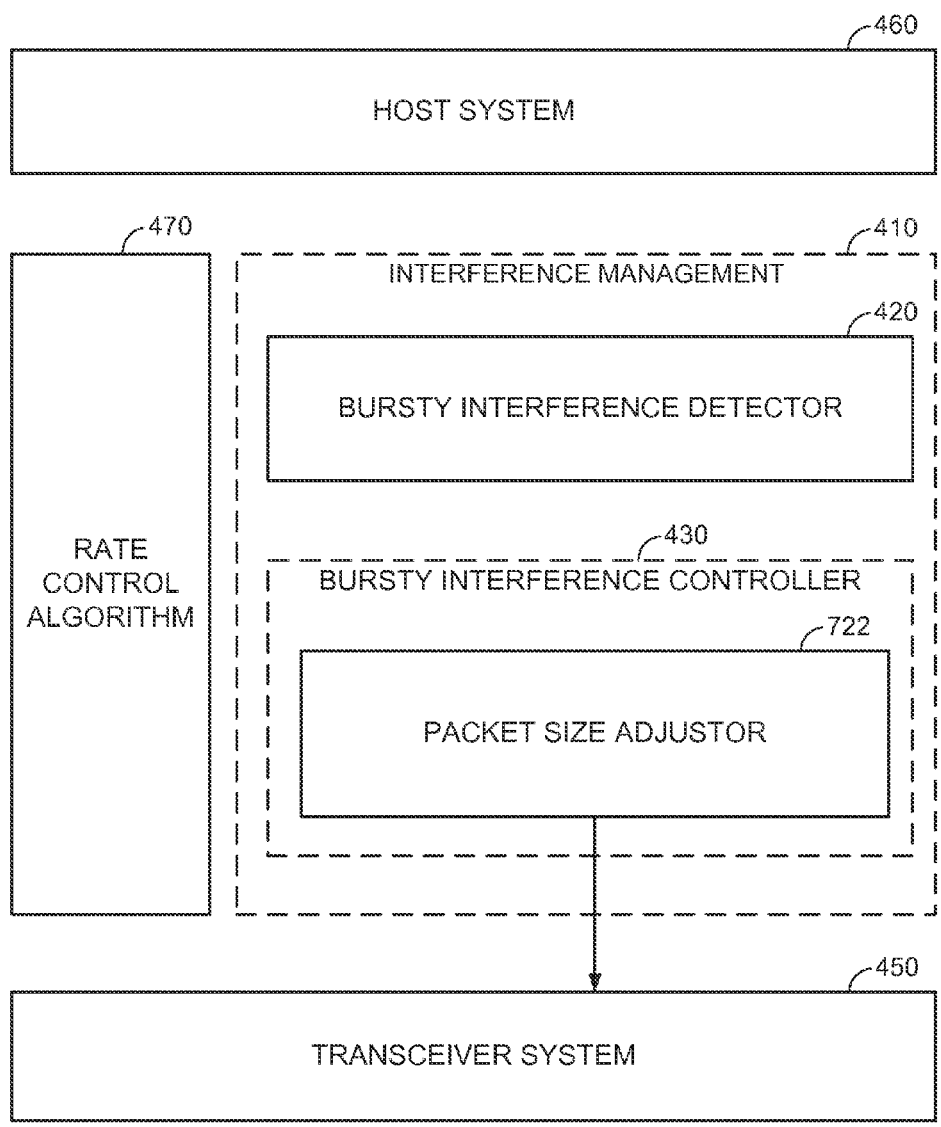
FIG. 7 is a block diagram illustrating another example design for one or more bursty interference control aspects of a bursty-interference-aware interference management module.

FIG. 7 is a block diagram illustrating another example design for one or more bursty interference control aspects of a bursty-interference-aware interference management module. In this example, the bursty interference controller 430 includes a packet size adjustor 722.

The packet size adjustor 722 is configured to adjust the size of individual MPDUs processed by the transceiver system 450 (e.g., via a packet size attribute associated with the MPDUs). By, for example, reducing the size of individual MPDUs (e.g., an MPDU reduction from 1500 bytes to 750 bytes) in response to the identification of a burst interference condition, the packet size adjustor 722 is able to increase the total number of packets in a given TxOP and effectively isolate the relative impact of a short interference burst to fewer packets, thereby maintaining or even increasing throughput.

Figure 8:
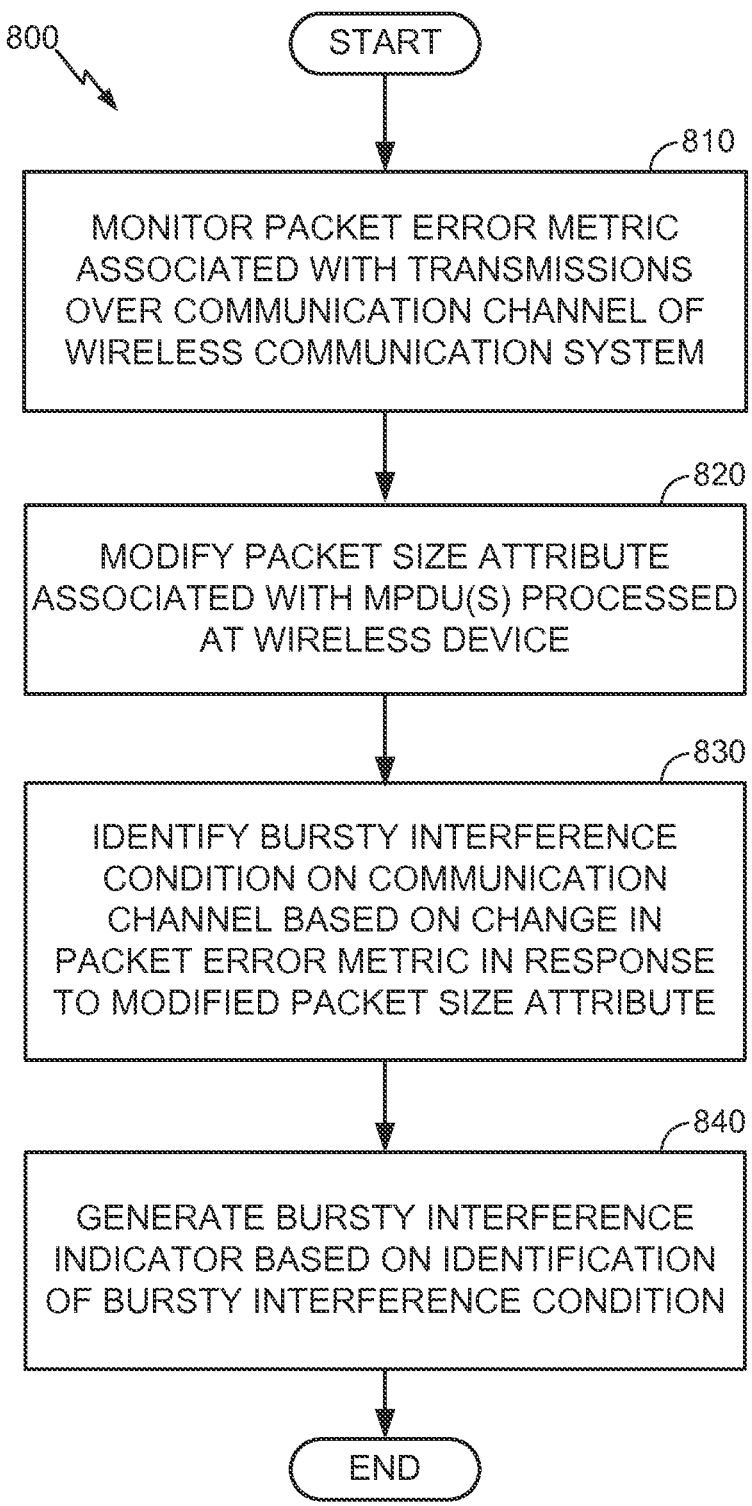
FIG. 8 is a flow diagram illustrating an example method of interference management for a wireless device in a wireless communication system.

FIG. 8 is a flow diagram illustrating an example method of interference management for a wireless device in a wireless communication system. The method may be performed by an access point (e.g., the AP 110 illustrated in FIG. 1), or more generally any entity performing rate control. In this example, the method 800 includes monitoring (e.g., periodically) a packet error metric associated with transmissions over a communication channel of the wireless communication system (block 810) and modifying a packet size attribute associated with MPDUs processed at the wireless device (block 820). Based on a change in the packet error metric in response to the modified packet size attribute, a bursty interference condition may be identified on the communication channel (block 830) and a bursty interference indicator may be generated based on the identification (block 840).

As discussed in more detail above, the packet size attribute may correspond, for example, to a number of bits or bytes defined for each MPDU. The bursty interference condition may be identified based on a decrease in the packet error metric in response to a decrease in the packet size attribute, or conversely, based on an increase in the packet error metric in response to an increase in the packet size attribute.

The monitoring (block 810) may be performed in different ways. For example, the monitoring may comprise requesting packet error information from a rate control algorithm operating at the wireless device. As a specific example, the monitoring may comprise determining a first packet error metric for a first transmission associated with a first packet size, and determining a second packet error metric for a second transmission associated with a second packet size, with the second packet size being different from the first packet size. In this example, the identifying (block 830) may comprises correlating a change between the first packet error metric and the second packet error metric with a change between the first packet size and the second packet size, and identifying the bursty interference condition based on a positive correlation between the changes.

The generating (block 840) may also be performed in different ways. For example, the generating may comprise generating a flag for a rate control algorithm operating at the wireless device. As another example, the generating may comprise generating an adjustment to the packet size attribute, and sending the adjusted packet size attribute to a transceiver. The adjustment to the packet size attribute may increase the number of MPDUs in at least one transmission opportunity, thereby reducing the relative number of MPDUs affected by the bursty interference.

Figure 9:
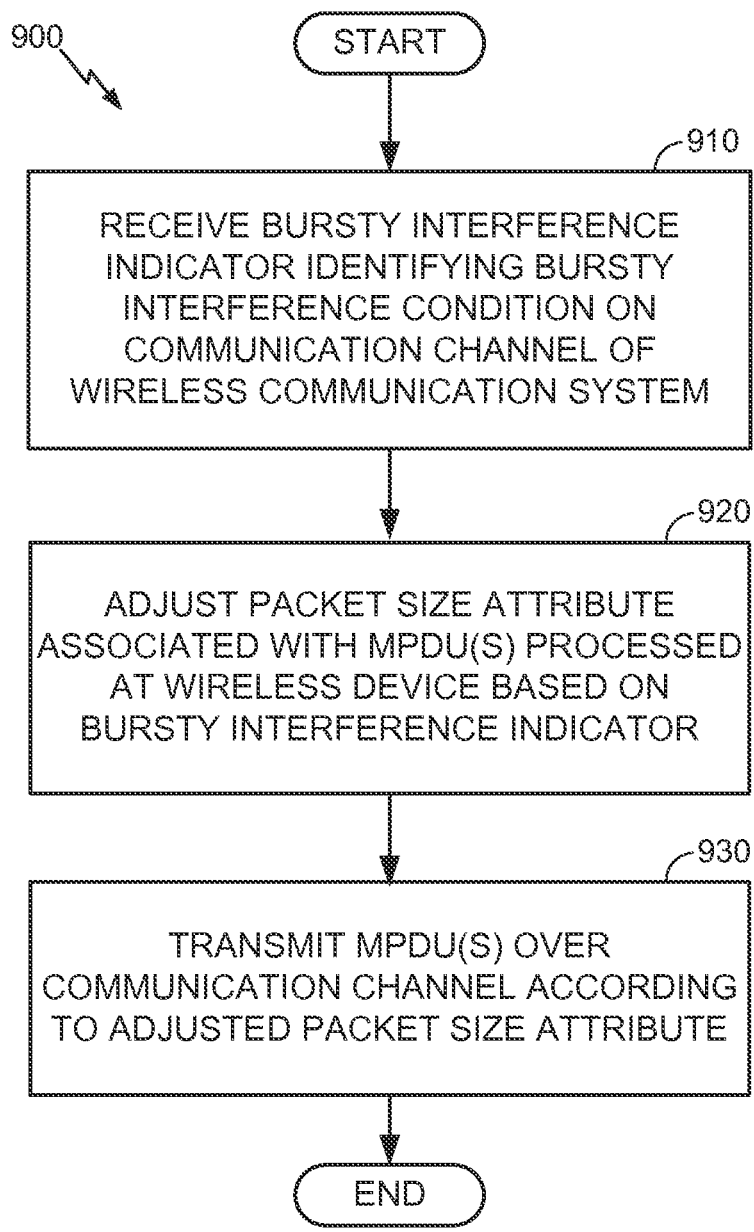
FIG. 9 is a flow diagram illustrating another example method of interference management for a wireless device in a wireless communication system.

FIG. 9 is a flow diagram illustrating another example method of interference management for a wireless device in a wireless communication system. The method may be performed by an access point (e.g., the AP 110 illustrated in FIG. 1), or more generally any entity performing rate control. In this example, the method 900 includes receiving a bursty interference indicator identifying a bursty interference condition on a communication channel of the wireless communication system (block 910) and adjusting a packet size attribute associated with MPDUs processed at the wireless device based on the bursty interference indicator (block 920). Following the adjustment, one or more MPDUs may be transmitted over the communication channel according to the adjusted packet size attribute (block 930).

As discussed in more detail above, the packet size attribute may correspond to a number of bits or bytes defined for each MPDU. The adjusting may comprise, for example, decreasing the packet size attribute in response to the bursty interference condition. The decreasing may be used to increase the number of MPDUs in at least one transmission opportunity, thereby reducing the relative number of MPDUs affected by the bursty interference.

Figure 10:
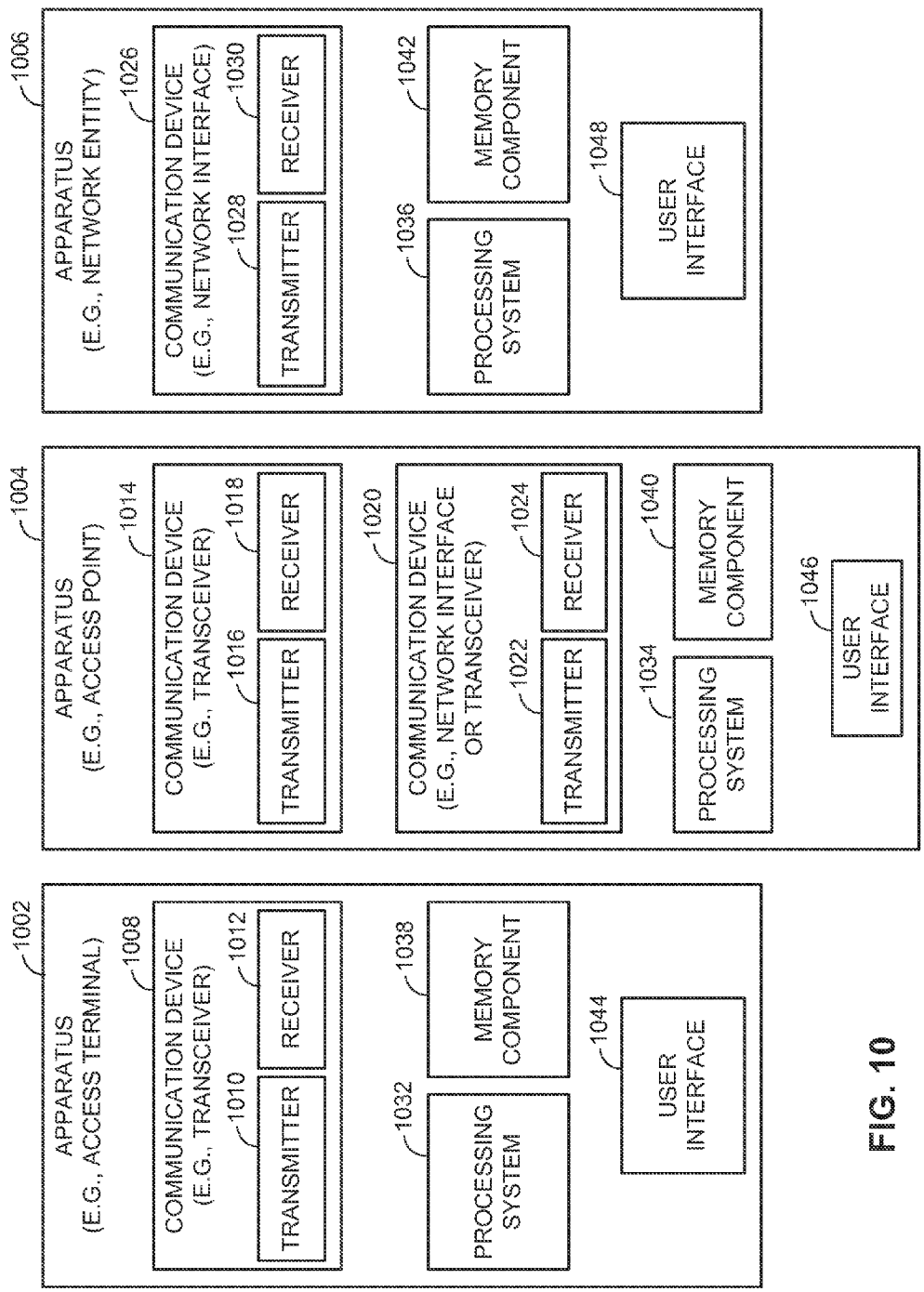
FIG. 10 is a simplified block diagram of several sample aspects of components that may be employed in communication nodes.

FIG. 10 illustrates several sample components (represented by corresponding blocks) that may be incorporated into an apparatus 1002, an apparatus 1004, and an apparatus 1006 (e.g., corresponding to an access terminal, an access point, and a network entity, respectively) to support interference management operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 1002 and the apparatus 1004 each include at least one wireless communication device (represented by the communication devices 1008 and 1014 (and the communication device 1020 if the apparatus 1004 is a relay)) for communicating with other nodes via at least one designated radio access technology. Each communication device 1008 includes at least one transmitter (represented by the transmitter 1010) for transmitting and encoding signals (e.g., messages, indications, information, and so on) and at least one receiver (represented by the receiver 1012) for receiving and decoding signals (e.g., messages, indications, information, pilots, and so on). Similarly, each communication device 1014 includes at least one transmitter (represented by the transmitter 1016) for transmitting signals (e.g., messages, indications, information, pilots, and so on) and at least one receiver (represented by the receiver 1018) for receiving signals (e.g., messages, indications, information, and so on). If the apparatus 1004 is a relay access point, each communication device 1020 may include at least one transmitter (represented by the transmitter 1022) for transmitting signals (e.g., messages, indications, information, pilots, and so on) and at least one receiver (represented by the receiver 1024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 1004 comprises a network listen module.

The apparatus 1006 (and the apparatus 1004 if it is not a relay access point) includes at least one communication device (represented by the communication device 1026 and, optionally, 1020) for communicating with other nodes. For example, the communication device 1026 may comprise a network interface that is configured to communicate with one or more network entities via a wire-based or wireless backhaul. In some aspects, the communication device 1026 may be implemented as a transceiver configured to support wire-based or wireless signal communication. This communication may involve, for example, sending and receiving: messages, parameters, or other types of information. Accordingly, in the example of FIG. 10, the communication device 1026 is shown as comprising a transmitter 1028 and a receiver 1030. Similarly, if the apparatus 1004 is not a relay access point, the communication device 1020 may comprise a network interface that is configured to communicate with one or more network entities via a wire-based or wireless backhaul. As with the communication device 1026, the communication device 1020 is shown as comprising a transmitter 1022 and a receiver 1024.

The apparatuses 1002, 1004, and 1006 also include other components that may be used in conjunction with interference management operations as taught herein. The apparatus 1002 includes a processing system 1032 for providing functionality relating to, for example, communicating with an access point to support interference management as taught herein and for providing other processing functionality. The apparatus 1004 includes a processing system 1034 for providing functionality relating to, for example, interference management as taught herein and for providing other processing functionality. The apparatus 1006 includes a processing system 1036 for providing functionality relating to, for example, interference management as taught herein and for providing other processing functionality. The apparatuses 1002, 1004, and 1006 include memory devices 1038, 1040, and 1042 (e.g., each including a memory device), respectively, for maintaining information (e.g., information indicative of reserved resources, thresholds, parameters, and so on). In addition, the apparatuses 1002, 1004, and 1006 include user interface devices 1044, 1046, and 1048, respectively, for providing indications (e.g., audible and/or visual indications) to a user and/or for receiving user input (e.g., upon user actuation of a sensing device such a keypad, a touch screen, a microphone, and so on).

For convenience, the apparatus 1002 is shown in FIG. 10 as including components that may be used in the various examples described herein. In practice, the illustrated blocks may have different functionality in different aspects.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1008, 1032, 1038, and 1044 may be implemented by processor and memory component(s) of the apparatus 1002 (e.g., by execution of appropriate code and/or by appropriate configuration of processor components). Similarly, some or all of the functionality represented by blocks 1014, 1020, 1034, 1040, and 1046 may be implemented by processor and memory component(s) of the apparatus 1004 (e.g., by execution of appropriate code and/or by appropriate configuration of processor components). Also, some or all of the functionality represented by blocks 1026, 1036, 1042, and 1048 may be implemented by processor and memory component(s) of the apparatus 1006 (e.g., by execution of appropriate code and/or by appropriate configuration of processor components).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
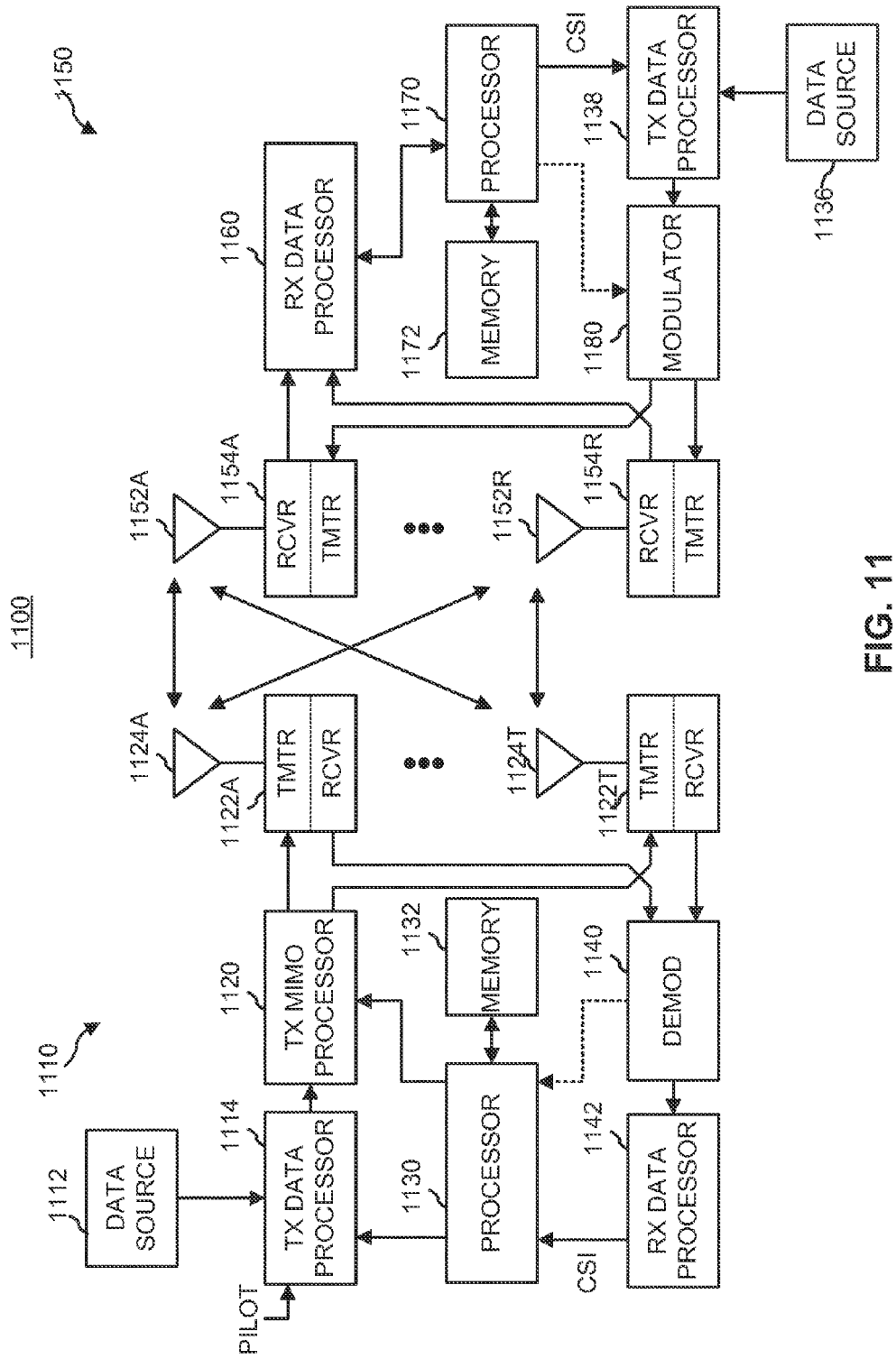
FIG. 11 is a simplified block diagram of several sample aspects of communication components.

FIG. 11 illustrates in more detail the components of a wireless device 1110 (e.g., an AP) and a wireless device 1150 (e.g., an STA) of a sample communication system 1100 that may be adapted as described herein. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

It will be appreciated that for each device 1110 and 1150 the functionality of two or more of the described components may be provided by a single component. It will be also be appreciated that the various communication components illustrated in FIG. 11 and described above may be further configured as appropriate to perform interference management as taught herein. For example, the processors 1130/1170 may cooperate with the memories 1132/1172 and/or other components of the respective devices 1110/1150 to perform the interference management as taught herein.

Figure 12:
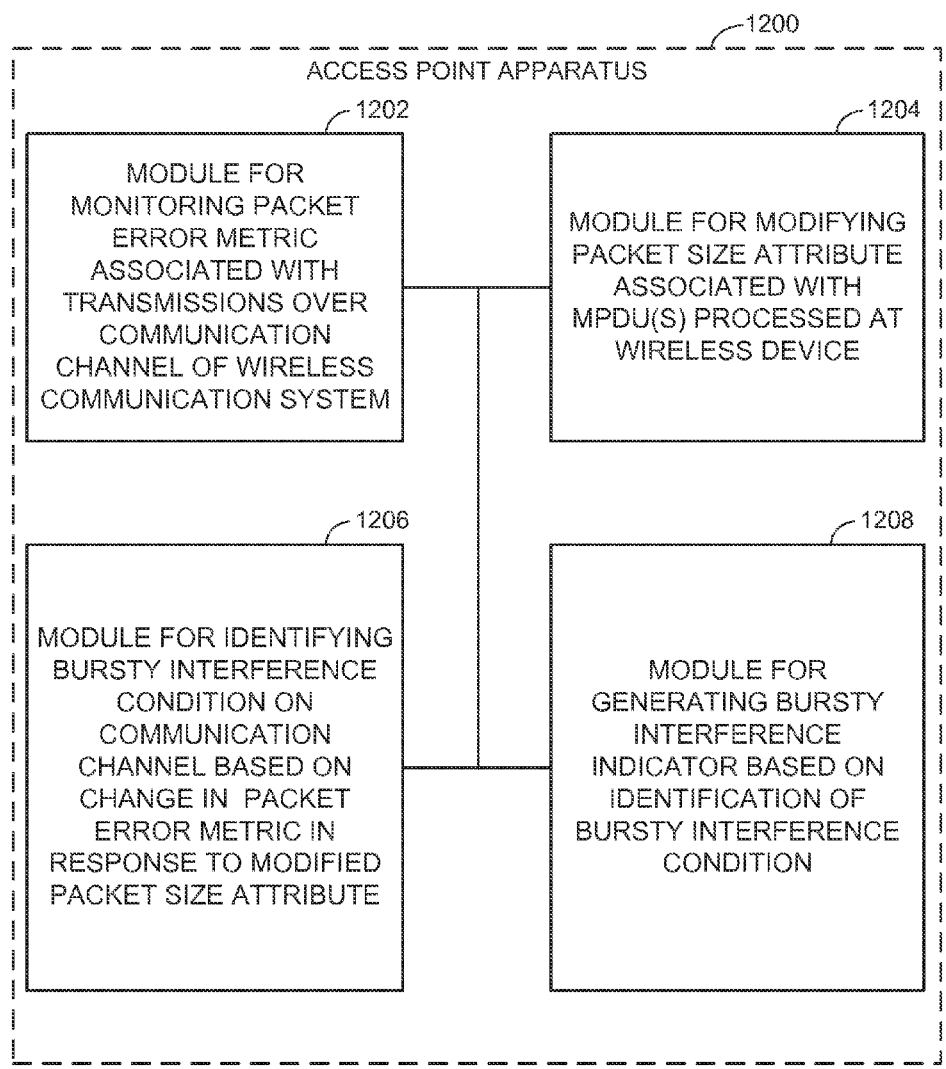
FIGS. 12 and 13 are simplified block diagrams of several sample aspects of apparatuses configured to support communication as taught herein.

FIG. 12 illustrates an example (e.g., access point) apparatus 1200 represented as a series of interrelated functional modules. A module for monitoring 1202 may correspond at least in some aspects to, for example, a communication device as discussed herein. A module for modifying 1204 may correspond at least in some aspects to, for example, a processing system as discussed herein. A module for identifying 1206 may correspond at least in some aspects to, for example, a processing system as discussed herein. A module for generating 1208 may correspond at least in some aspects to, for example, a processing system as discussed herein.

Figure 13:
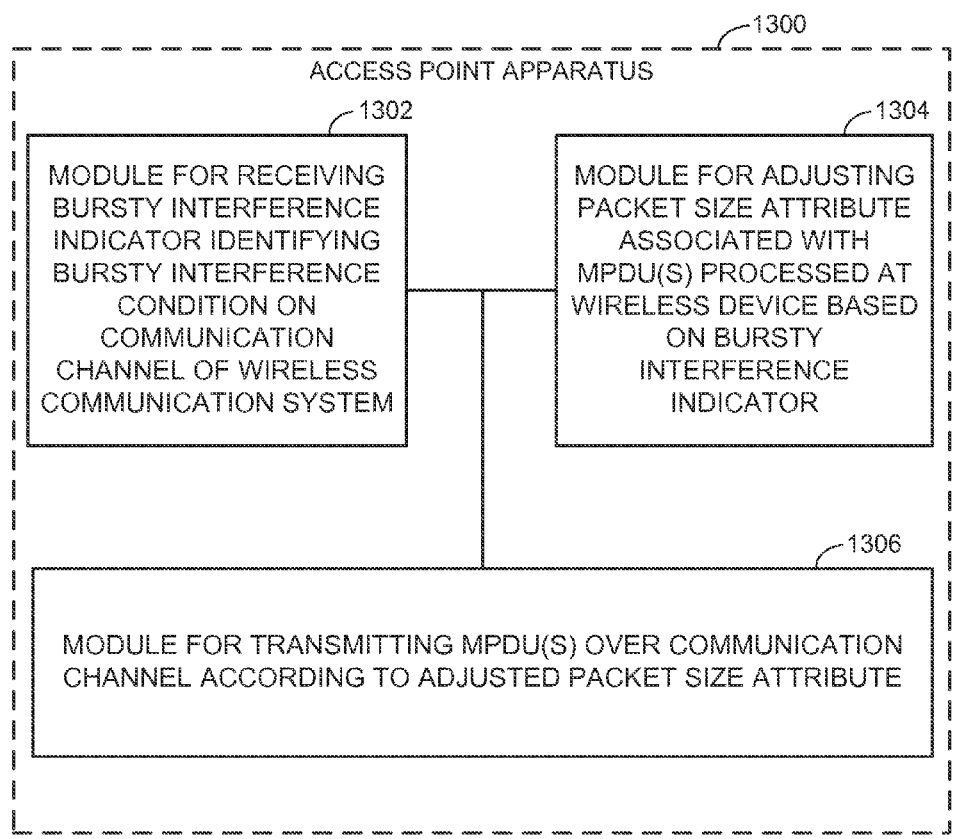

FIG. 13 illustrates an example (e.g., access point) apparatus 1300 represented as a series of interrelated functional modules. A module for receiving 1302 may correspond at least in some aspects to, for example, a communication device as discussed herein. A module for adjusting 1304 may correspond at least in some aspects to, for example, a processing system as discussed herein. A module for transmitting 1306 may correspond at least in some aspects to, for example, a communication device as discussed herein.

The functionality of the modules of FIGS. 12-13 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIGS. 12-13 as well as other components and functions described herein, may be implemented using any suitable means. Such means also may be implemented, at least in part, using corresponding structure as taught herein. For example, the components described above in conjunction with the "module for" components of FIGS. 12-13 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for interference management for a wireless device in a wireless communication system. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of interference management for a wireless device in a wireless communication system, comprising:
   monitoring a packet error metric associated with transmissions over a communication channel of the wireless communication system;
   modifying a packet size attribute associated with media access control (MAC) protocol data units (MPDUs) processed at the wireless device;
   identifying a bursty interference condition on the communication channel based on a change in the packet error metric in response to the modified packet size attribute; and
   generating a bursty interference indicator based on the identification of the bursty interference condition.

2. The method of claim 1, wherein the packet size attribute corresponds to a number of bits or bytes defined for each MPDU.

3. The method of claim 1, wherein the bursty interference condition is identified based on a decrease in the packet error metric in response to a decrease in the packet size attribute.

4. The method of claim 1, wherein the bursty interference condition is identified based on an increase in the packet error metric in response to an increase in the packet size attribute.

5. The method of claim 1, wherein the monitoring comprises requesting packet error information from a rate control algorithm operating at the wireless device.

6. The method of claim 1, wherein the monitoring comprises:
   determining a first packet error metric for a first transmission associated with a first packet size; and
   determining a second packet error metric for a second transmission associated with a second packet size, wherein the second packet size is different from the first packet size.

7. The method of claim 6, wherein the identifying comprises:
   correlating a change between the first packet error metric and the second packet error metric with a change between the first packet size and the second packet size; and
   identifying the bursty interference condition based on a positive correlation between the changes.

8. The method of claim 1, wherein the generating comprises generating a flag for a rate control algorithm operating at the wireless device.

9. The method of claim 1, wherein the generating comprises:
   generating an adjustment to the packet size attribute; and
   sending the adjusted packet size attribute to a transceiver.

10. The method of claim 9, wherein the adjustment to the packet size attribute increases the number of MPDUs in at least one transmission opportunity.

11. An apparatus for interference management for a wireless device in a wireless communication system, comprising:
   a processor configured to:
      monitor a packet error metric associated with transmissions over a communication channel of the wireless communication system,
      modify a packet size attribute associated with media access control (MAC) protocol data units (MPDUs) processed at the wireless device,
      identify a bursty interference condition on the communication channel based on a change in the packet error metric in response to the modified packet size attribute, and
      generate a bursty interference indicator based on the identification of the bursty interference condition; and
   memory coupled to the processor for storing data.

12. The apparatus of claim 11, wherein the packet size attribute corresponds to a number of bits or bytes defined for each MPDU.

13. The apparatus of claim 11, wherein the bursty interference condition is identified based on a decrease in the packet error metric in response to a decrease in the packet size attribute.

14. The apparatus of claim 11, wherein the bursty interference condition is identified based on an increase in the packet error metric in response to an increase in the packet size attribute.

15. The apparatus of claim 11, wherein the monitoring comprises requesting packet error information from a rate control algorithm operating at the wireless device.

16. The apparatus of claim 11, wherein the monitoring comprises:
   determining a first packet error metric for a first transmission associated with a first packet size; and determining a second packet error metric for a second transmission associated with a second packet size, wherein the second packet size is different from the first packet size.

17. The apparatus of claim 16, wherein the identifying comprises:
correlating a change between the first packet error metric and the second packet error metric with a change between the first packet size and the second packet size; and
identifying the bursty interference condition based on a positive correlation between the changes.

18. The apparatus of claim 11, wherein the generating comprises generating a flag for a rate control algorithm operating at the wireless device.

19. The apparatus of claim 11, wherein the generating comprises:
generating an adjustment to the packet size attribute; and
sending the adjusted packet size attribute to a transceiver.

20. The apparatus of claim 19, wherein the adjustment to the packet size attribute increases the number of MPDUs in at least one transmission opportunity.

21. An apparatus for interference management for a wireless device in a wireless communication system, comprising:
means for monitoring a packet error metric associated with transmissions over a communication channel of the wireless communication system;
means for modifying a packet size attribute associated with media access control (MAC) protocol data units (MPDUs) processed at the wireless device;
means for identifying a bursty interference condition on the communication channel based on a change in the packet error metric in response to the modified packet size attribute; and
means for generating a bursty interference indicator based on the identification of the bursty interference condition.

22. The apparatus of claim 21, wherein the packet size attribute corresponds to a number of bits or bytes defined for each MPDU.

23. The apparatus of claim 21, wherein the bursty interference condition is identified based on a decrease in the packet error metric in response to a decrease in the packet size attribute.

24. The apparatus of claim 21, wherein the bursty interference condition is identified based on an increase in the packet error metric in response to an increase in the packet size attribute.

25. The apparatus of claim 21, wherein the means for monitoring comprises means for requesting packet error information from a rate control algorithm operating at the wireless device.

26. The apparatus of claim 21, wherein the means for monitoring comprises:
means for determining a first packet error metric for a first transmission associated with a first packet size; and
means for determining a second packet error metric for a second transmission associated with a second packet size, wherein the second packet size is different from the first packet size.

27. The apparatus of claim 26, wherein the means for identifying comprises:
means for correlating a change between the first packet error metric and the second packet error metric with a change between the first packet size and the second packet size; and
means for identifying the bursty interference condition based on a positive correlation between the changes.

28. The apparatus of claim 21, wherein the means for generating comprises means for generating a flag for a rate control algorithm operating at the wireless device.

29. The apparatus of claim 21, wherein the means for generating comprises:
means for generating an adjustment to the packet size attribute; and
means for sending the adjusted packet size attribute to a transceiver.

30. The apparatus of claim 29, wherein the adjustment to the packet size attribute increases the number of MPDUs in at least one transmission opportunity.

31. A non-transitory computer-readable medium comprising code, which, when executed by a processor, causes the processor to perform operations for interference management for a wireless device in a wireless communication system, the non-transitory computer-readable medium comprising:
code for monitoring a packet error metric associated with transmissions over a communication channel of the wireless communication system;
code for modifying a packet size attribute associated with media access control (MAC) protocol data units (MPDUs) processed at the wireless device;
code for identifying a bursty interference condition on the communication channel based on a change in the packet error metric in response to the modified packet size attribute; and
code for generating a bursty interference indicator based on the identification of the bursty interference condition.

32. The non-transitory computer-readable medium of claim 31, wherein the packet size attribute corresponds to a number of bits or bytes defined for each MPDU.

33. The non-transitory computer-readable medium of claim 31, wherein the bursty interference condition is identified based on a decrease in the packet error metric in response to a decrease in the packet size attribute.

34. The non-transitory computer-readable medium of claim 31, wherein the bursty interference condition is identified based on an increase in the packet error metric in response to an increase in the packet size attribute.

35. The non-transitory computer-readable medium of claim 31, wherein the code for monitoring comprises code for requesting packet error information from a rate control algorithm operating at the wireless device.

36. The non-transitory computer-readable medium of claim 31, wherein the code for monitoring comprises:
code for determining a first packet error metric for a first transmission associated with a first packet size; and
code for determining a second packet error metric for a second transmission associated with a second packet size, wherein the second packet size is different from the first packet size.

37. The non-transitory computer-readable medium of claim 36, wherein the code for identifying comprises:
code for correlating a change between the first packet error metric and the second packet error metric with a change between the first packet size and the second packet size; and
code for identifying the bursty interference condition based on a positive correlation between the changes.

38. The non-transitory computer-readable medium of claim 31, wherein the code for generating comprises code for generating a flag for a rate control algorithm operating at the wireless device.

39. The non-transitory computer-readable medium of claim 31, wherein the code for generating comprises:
- code for generating an adjustment to the packet size attribute; and
- code for sending the adjusted packet size attribute to a transceiver.

40. The non-transitory computer-readable medium of claim 39, wherein the adjustment to the packet size attribute increases the number of MPDUs in at least one transmission opportunity.

\* \* \* \* \*